(12) United States Patent
Nicolaescu

(10) Patent No.: US 7,013,070 B2
(45) Date of Patent: Mar. 14, 2006

(54) METHOD AND APPARATUS FOR SWITCHING AN OPTICAL BEAM BETWEEN FIRST AND SECOND WAVEGUIDES IN A SEMICONDUCTOR SUBSTRATE LAYER

(75) Inventor: Remus Nicolaescu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 10/162,826

(22) Filed: Jun. 4, 2002

(65) Prior Publication Data

US 2003/0223698 A1 Dec. 4, 2003

(51) Int. Cl.
*G02F 1/295* (2006.01)

(52) U.S. Cl. .............................. 385/50; 385/41; 385/9; 385/16

(58) Field of Classification Search .................. 385/14, 385/30, 39, 40, 41, 42, 50, 8, 9, 11, 21–23, 385/16; 359/248
See application file for complete search history.

(56) References Cited

U.S. PATENT DOCUMENTS

| | | | | |
|---|---|---|---|---|
| 3,957,341 | A | * | 5/1976 | Taylor .......................... 385/27 |
| 3,976,358 | A | * | 8/1976 | Thompson .................... 385/41 |
| 4,082,419 | A | * | 4/1978 | Thompson et al. ........... 385/41 |
| 4,787,691 | A | | 11/1988 | Lorenzo et al. |
| 4,869,569 | A | * | 9/1989 | Kapon ........................... 385/2 |
| 5,125,065 | A | * | 6/1992 | Stoll et al. ................... 385/130 |
| 5,159,699 | A | | 10/1992 | de Monts |
| 5,347,601 | A | * | 9/1994 | Ade et al. ....................... 385/3 |
| 5,481,636 | A | | 1/1996 | Fukuda et al. |
| 5,502,781 | A | | 3/1996 | Li et al. |
| 5,862,276 | A | * | 1/1999 | Karras .......................... 385/30 |
| 5,908,305 | A | | 6/1999 | Crampton et al. |
| 6,002,823 | A | * | 12/1999 | Chandross et al. ........... 385/50 |
| 6,144,779 | A | | 11/2000 | Binkley et al. |
| 6,253,000 | B1 | | 6/2001 | Madsen et al. |
| 6,292,597 | B1 | | 9/2001 | Lagali et al. |
| 6,545,791 | B1 | * | 4/2003 | McCaughan et al. ....... 359/245 |
| 2002/0025103 | A1 | | 2/2002 | Thaniyavarn |
| 2002/0131712 | A1 | * | 9/2002 | Markwardt et al. ........... 385/40 |
| 2004/0101227 | A1 | | 5/2004 | Takabayashi et al. |

FOREIGN PATENT DOCUMENTS

WO WO 00/72064 A1 11/2000

OTHER PUBLICATIONS

Soref, R.A., "Vertically Integrated Silicon-on-Insulator Waveguides", IEEE Photonics Technology Letters, vol. 3., No. 1., Jan. 1991.

Bachmann, M., et al., "General Self-Imaging Properties In NxN Multimode Interference Couplers Including Phase Relations," Applied Optics, vol. 33, No. 18, Jun. 20, 1994, pp. 3905-3911.

(Continued)

*Primary Examiner*—David V. Bruce
*Assistant Examiner*—Krystyna Suchecki
(74) *Attorney, Agent, or Firm*—Blakely, Sokoloff, Taylor & Zafman LLP

(57) ABSTRACT

An optical switching method and apparatus. In one aspect of the present invention, the disclosed apparatus includes first and optical waveguides disposed in a semiconductor substrate layer. An insulating layer disposed between the first and second waveguides in a coupling region in the semiconductor substrate layer to isolate the first optical waveguide from the second optical waveguide. Modulated charge layers proximate to the insulating layer in the coupling region are employed to control an optical coupling strength between the first and second optical waveguides.

28 Claims, 5 Drawing Sheets

OTHER PUBLICATIONS

Soldano, L.B., et al., "Optical Multi-Mode Interference Devices Based on Self-Imaging: Principles and Applications," Journal of Lightwave Technology, vol. 13, No. 4, Apr. 1995, pp. 615-627.

Rasmussen, T., et al, "Design and Performance Evaluation of 1-by-64 Multimode Interference Power Splitter for Optical Communications," Journal of Lightwave Technology, vol. 13, No. 10, Oct. 1995, pp. 2069-2074.

Rajarajan, M. et al., "Accurate Analysis of MMI Devices with Two-Dimensional Confinement," Journal of Lightwave Technology, vol. 14, No. 9, Sep. 1996, pp. 2078-2084.

Smit, M.K., et al., "Phasar-Based WDM-Devices: Principles, Design and Applications," IEEE Journal of Selected Topics In Quantum Electronics, vol. 2, No. 2, Jun. 1996, pp. 236-250.

Kareenahalli, S., et al., "Experimental Confirmation of Phase Relationships of Multimode Interference Splitters Using a Shearing-Type Near-Field Sagnac Interferometer," IEEE Photonics Technology Letters, Jul. 1997, pp. 937-939.

Lorenzo, R.M., et al., "Improved Self-Imaging Characteristics in 1xN Multimode Couplers," IEE Proc.-Optoelectron, vol. 145, No. 1, Feb. 1998, pp. 65-69.

Padmanabhan, K. et al., "Dilated Networks for Photonic Switching," IEEE Transactions on Communications, vol. Com-35, No. 12, Dec. 1987.

PCT/US03/15387 Written Opinion, dated May 23, 2005.

* cited by examiner

FIG. 3A    FIG. 3B

METHOD AND APPARATUS FOR SWITCHING AN OPTICAL BEAM BETWEEN FIRST AND SECOND WAVEGUIDES IN A SEMICONDUCTOR SUBSTRATE LAYER

BACKGROUND OF THE INVENTION

1. Field of the Invention

The present invention relates generally to optical signals and, more specifically, the present invention relates to switching optical signals.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Commonly found types of optical switches are mechanical switching devices, thermal switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

Thermal switching devices rely on a temperature-induced change of the refractive index to switch the light. This approach is popular because to almost all materials exhibit this behavior. The disadvantage for them is the time it takes to warm and cool the devices to get them to switch. Typical times are on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate (LiNbO3).

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for switching optical beams in a semiconductor substrate are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical device is provided in a fully integrated solution on a single integrated circuit chip. In one embodiment, an optical switch is realized in a single semiconductor substrate layer of the integrated circuit chip. In one embodiment, the optical device may be employed as a 1×2 or a 2×2 optical switch to selectively switch an optical beam to one of two optical waveguides in the same semiconductor substrate layer in accordance with the teachings of the present invention. In another embodiment, an optical device may be employed to modulate an amplitude of an optical beam or variably optically attenuate the optical beam. Embodiments of the disclosed optical devices can be used in a variety of high bandwidth applications including multi-processor, telecommunications, networking or the like. For example, embodiments of the present invention may be employed as fast (e.g. sub-nanosecond) optical switches in optical networking systems.

Figure 1:
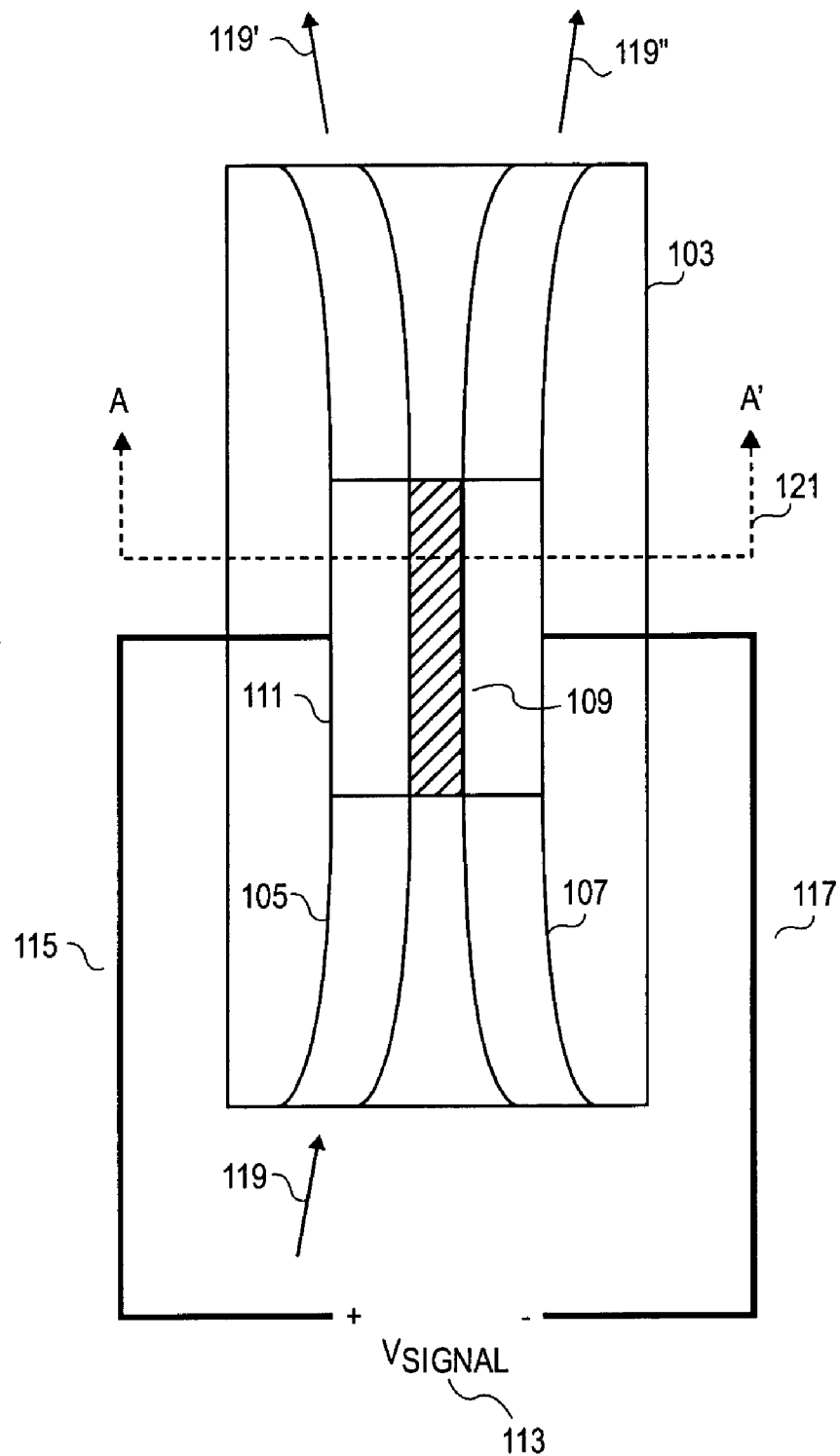
FIG. 1 is a top view diagram of one embodiment of an optical device in accordance with the teachings of the present invention.

FIG. 1 is a block diagram illustrating one embodiment of an optical device 101 in accordance with the teachings of the present invention. As shown in the depicted embodiment, optical device 101 includes a semiconductor substrate layer 103 in which a first optical waveguide 105 and a second optical waveguide 107 are disposed. In one embodiment, semiconductor substrate layer 103 includes silicon, polysilicon or another suitable semiconductor material such as for example but not limited to III–V semiconductor materials. In one embodiment, first and second waveguides 105 and 107 are single mode waveguides. An insulating layer 109 is disposed in semiconductor substrate layer 103 between first and second optical waveguides 105 and 107 in a coupling region 111 of optical device 101. In one embodiment, insulating layer 109 includes an oxide, such as for example silicon oxide, to isolate first optical waveguide 105 from second optical waveguide 107.

In operation a signal $V_{SIGNAL}$ 113 is applied through electrodes 115 and 117 to waveguides 105 and 107 to modulate an electric field across insulating layer 109 to control modulated charge layers proximate to insulating layer 109 in coupling region 111. In one embodiment, electrodes are electrically connected to first and second optical waveguides 105 and 107 at locations outside the optical path of optical beam 119. In one embodiment, the modulated charge layers proximate to insulating layer 109 control an optical coupling strength between first and second optical waveguides 105 and 107 in coupling region 111 in response to $V_{SIGNAL}$ 113. In one embodiment, a capacitive structure is defined in the coupling region 111 of semiconductor substrate 103 with insulating layer 109 separating the modulated charge layers proximate to insulating layer 109 in first and second waveguides 105 and 107. It is appreciated that with the capacitive device approach employed with embodiments of the present invention, high speed response of optical device 101 is realized.

In operation, an optical beam 119 is launched or directed into first waveguide 105. When optical beam 119 propagates into coupling region 111, evanescent coupling occurs between first and second optical waveguides 105 and 107 across insulating layer 109. The modulated charger layers proximate to insulating layer 109 control the coupling strength between the adjacent or neighboring first and second optical waveguides 105 and 107. By controlling the coupling strength in response to $V_{SIGNAL}$ 113, optical beam 119 is selectively directed out from coupling region 111 through first optical waveguide 105 or second optical waveguide 107 in accordance with the teachings of the present invention. In FIG. 1, depending on $V_{SIGNAL}$ 113, optical beam 119 is illustrated leaving coupling region 111 through first optical waveguide 105 as optical beam 119'. Similarly, optical beam 119 is illustrated leaving coupling region 111 through second optical waveguide 107 as optical beam 119".

Figure 2:
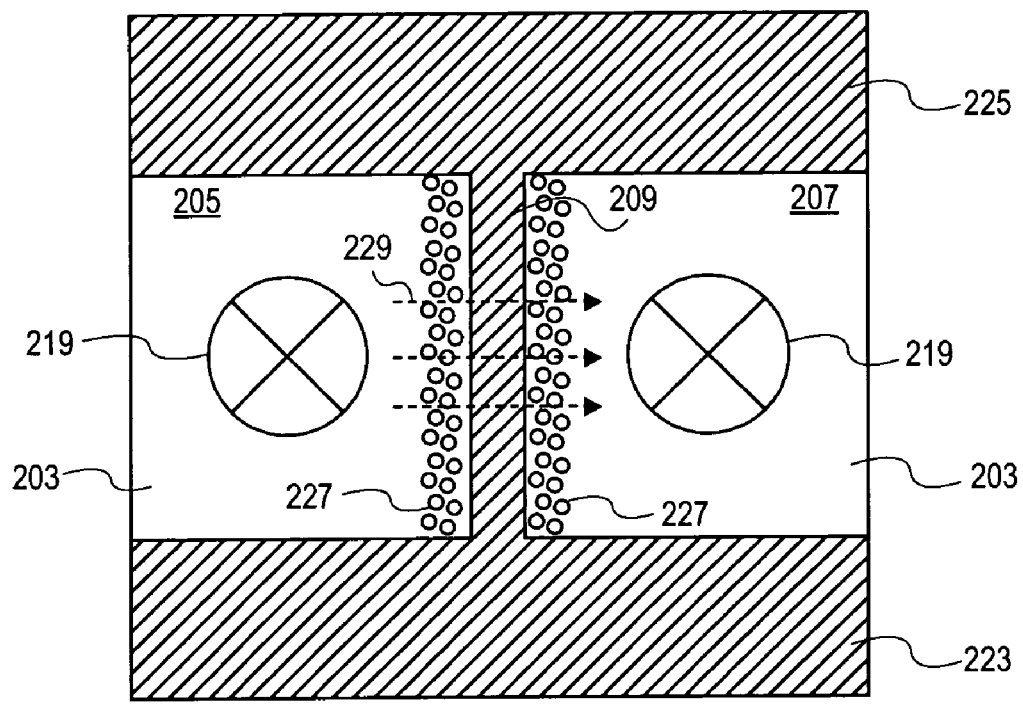
FIG. 2 is a cross-section diagram through a coupling region of one embodiment of an optical device in accordance with the teachings of the present invention.

To illustrate, FIG. 2 is a cross-section illustration of an embodiment of an optical device 201, which represents a cross-section illustration along dashed line A–A' 121 of FIG. 1 through coupling region 111 of optical device 101. As shown in the depicted embodiment, optical device 201 includes a semiconductor substrate layer 203 disposed between an insulating layer 223 and an insulating layer 225.

In one embodiment, optical device 201 is included in a silicon-on-insulator (SOI) type of wafer and insulating layer 223 is the buried oxide layer of the SOI wafer. FIG. 2 also shows that in an embodiment semiconductor substrate layer 203 includes an insulating layer 209 separating a first optical waveguide 205 and a second optical waveguide 207.

As shown, modulated charge layers 227 are modulated proximate to insulating layer 209 in an embodiment. Depending on the doping included in first and second optical waveguides 205 and 207, modulated charge layers 227 may include electrons, holes or a combination thereof. In addition, optical device may be biased to operate in accumulation mode, inversion mode or depletion mode. It is appreciated that a capacitive structure is defined with modulated charge layers 227 forming the "plates" of a capacitor separated by insulating layer 209.

In operation, an optical beam 219 may be launched or directed into first optical waveguide 205. Optical beam 219 is illustrated in FIG. 2 going through the page. When optical beam 219 propagates next to insulating layer 209, an evanescent coupling 229 occurs through insulating layer 209 such that optical beam 219 propagates from first optical waveguide 205 to second optical waveguide 207. In one embodiment, the effective index of refraction through insulating layer 209 is modulated in response to modulated charge layers 227 due to the plasma optical effect. The plasma optical effect arises due to an interaction between the optical electric field vector and free charge carriers that may be present along the propagation path of the optical beam 219 along evanescent coupling 229. The electric field of the optical beam 219 induces a change in the velocity of the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. The free charge carriers are accelerated by the field and also lead to absorption of the optical field as optical energy is used up. Generally the index of refraction perturbation is a complex number with the real part being that part which causes the velocity change and the imaginary part being related to the free charge carrier absorption. The amount of phase shift $\phi$ is given by $$\phi = (2\pi/\lambda)\Delta nL \qquad \text{(Equation 1)}$$

with the optical wavelength in vacuum $\lambda$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{\Delta N_e}{m_e^*} + \frac{\Delta N_h}{m_h^*}\right) \qquad \text{(Equation 2)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively.

Therefore, as will be discussed in further detail below, the coupling strength of the evanescent coupling 229 is responsive in one embodiment to the free charge carrier concentration in modulated charge layers 227. In one embodiment, the free charge carrier concentration in modulated charge layers 227 is responsive to an applied signal, such as for example signal $V_{SIGNAL}$ 113 of FIG. 1.

Figure 3:
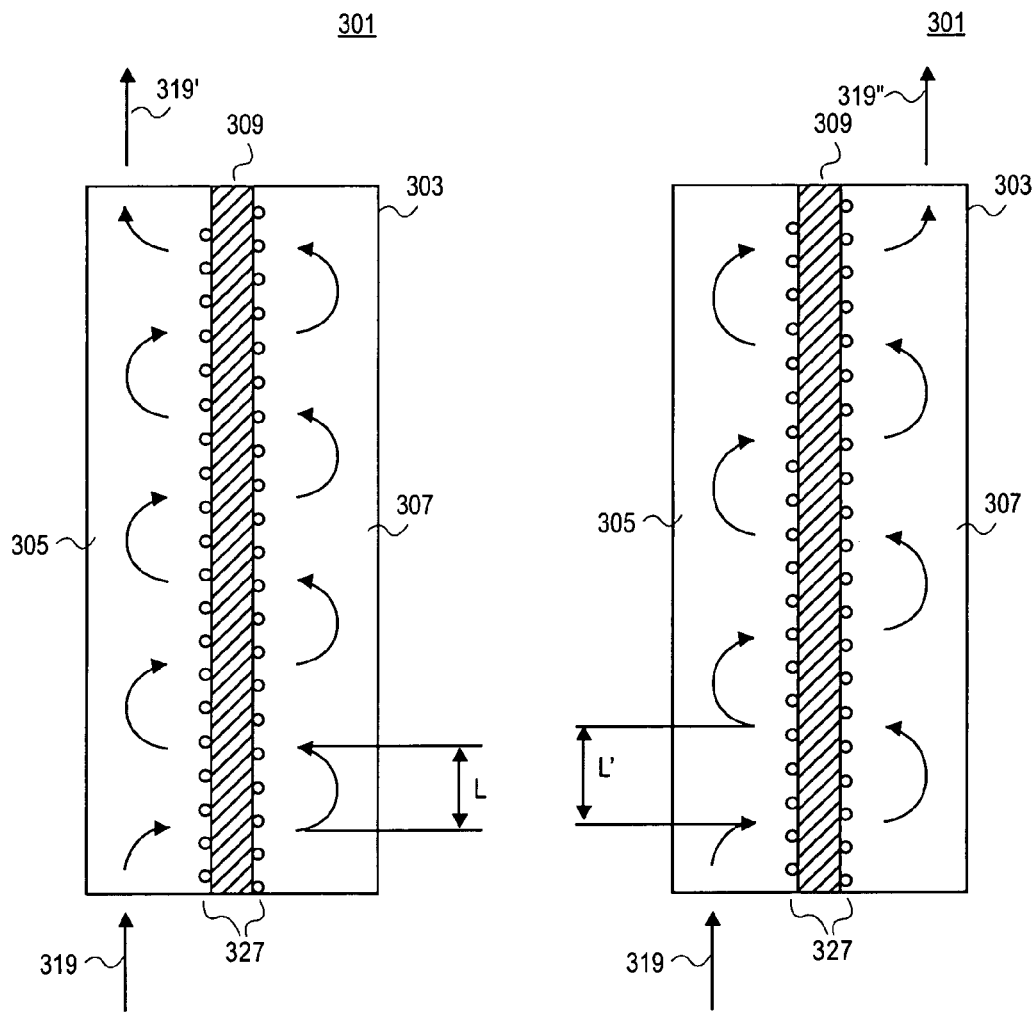
FIG. 3A is an illustration showing an evanescent coupling of an optical beam through an insulating layer between waveguides of one embodiment of an optical device with no voltage signal applied in accordance with the teachings of the present invention.
FIG. 3B is an illustration showing an evanescent coupling of an optical beam through an insulating layer between waveguides of one embodiment of an optical device with a voltage signal applied in accordance with the teachings of the present invention.

To illustrate, FIGS. 3A and 3B are illustrations of one embodiment of an optical device 301 including a semiconductor substrate layer 303 having a first optical waveguide 305 and a second optical waveguide 307 separated by insulating layer 309. It is appreciated that one embodiment of optical device 301 corresponds to the coupling region 111 of optical device 101 in FIG. 1. Modulated charge layers 327 are proximate to insulating layer 309. For explanation purposes, modulated charge layers 327 are modulated in FIG. 3B to have a greater free charge carrier concentration than the charge carrier concentration of modulated charge layers 327 in FIG. 3A.

In operation, optical beam 319 is launched or directed into first optical waveguide 305. When optical beam 319 propagates into the coupling region, it is evanescently coupled back and forth between the first and second waveguides 305 and 307 as shown. In one embodiment, the coupling strength between the first and second optical waveguides 305 and 307 is responsive to the free charge carrier concentration in modulated charge layers 327. Accordingly, the coupling length L, as illustrated in FIG. 3A, and illustrated as L' in FIG. 3B is responsive to modulated charge layers 327.

In the example illustrated in FIG. 3A, the free charge carrier concentration of modulated charge layers 327 is modulated such that the coupling strength between first and second optical waveguides 305 and 307 through insulating layer 309 is modulated. Accordingly, coupling length L is modulated to have a value that results in optical beam 319' exiting the coupling region of optical device 301 via first optical waveguide 305. In contrast, modulated charge layers 327 are modulated in FIG. 3B such that coupling length L' has a value that results in optical beam 319" exiting the coupling region of optical device 301 via second optical waveguide 307 since the geometry and the total length of the coupling region of optical device 301 is fixed. Therefore, in the example embodiments illustrated in FIGS. 3A and 3B, optical device 301 functions as shown to operate as a 1×2 switch.

It is appreciated that in another embodiment, another optical beam may also be launched or directed into second optical waveguide 307 and that optical device 301 therefore would operate as a 2×2 switch. In addition, depending on the free charge carrier concentration of modulated charge layers 327 and the resulting the coupling lengths L and/or L", optical device also functions as an amplitude modulator and/or a variable optical attenuator. Indeed, the amplitudes of optical beam 319' or 319", which are output from first and second optical waveguides 305 and 307, respectively, are modulated in response to the coupling lengths L or L', which are modulated in response to modulated charge layers 327.

In one embodiment, optical beam 319 includes infrared or near infrared light or any other suitable wavelength of light that may propagate through semiconductor substrate layer 303. In one embodiment, optical beam 319 is polarized in a direction parallel to insulating layer 309. In an embodiment with another optical beam launched or directed into second optical waveguide 307, the other optical beam is also polarized in a direction parallel to insulating layer 309. In one embodiment, in order to make a polarization insensitive optical device 301, the two polarizations are treated separately. The incoming light is split into two orthogonal polarization components and then each polarization component is switched separately and the outputs are recombined.

Figure 4:
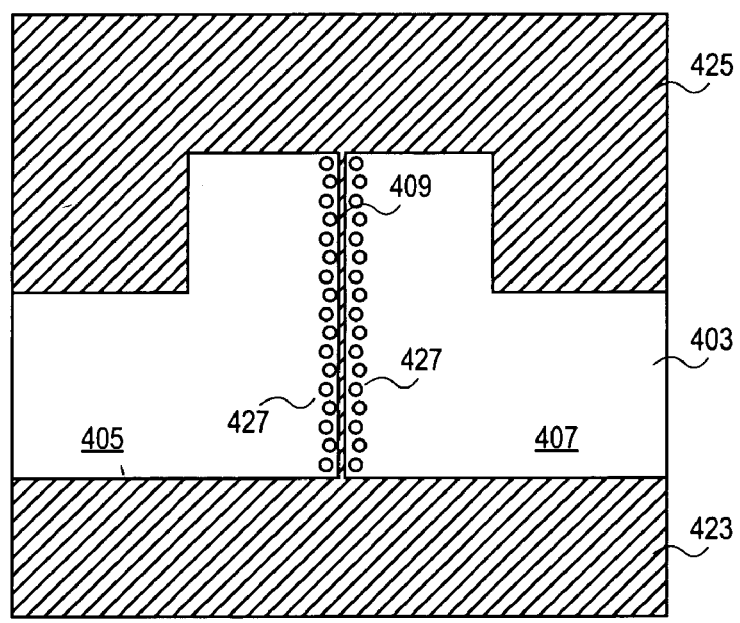
FIG. 4 is another cross-section diagram through the coupling region of one embodiment of an optical device in accordance with the teachings of the present invention

FIG. 4 provides another cross-section illustration of one embodiment of an optical device 401 in accordance with the teachings of the present invention. In one embodiment, the cross-section illustration in FIG. 4 also represents a cross-section illustration along dashed line A–A' 121 of FIG. 1 through coupling region 111 of optical device 101. As illustrated in FIG. 4, optical device 401 includes a semiconductor substrate layer 403 disposed between an insulating layer 423 and an insulating layer 425. In one embodiment, optical device 401 is included in an SOI wafer and insulating layer 423 is the buried oxide layer of the SOI wafer. FIG. 4 also shows that in an embodiment semiconductor substrate layer 403 includes an insulating layer 409 separating a first optical waveguide 405 and a second optical waveguide 407. As shown, modulated charge layers 427 are modulated proximate to insulating layer 409 in an embodiment.

As discussed above, modulated charge layers 427 provide a thin layer of charge to control the coupling strength between adjacent neighboring first and second optical waveguides 405 and 407. In one embodiment, the cross-section portion of optical device 401 may be characterized as a two mode waveguide in which an insulating layer 409 is inserted in the middle, which therefore vertically isolates the two halves of the two mode waveguide. In the alternative, the cross-section portion of optical device 401 may also be characterized as two single mode asymmetric waveguides separated by a thin layer of oxide. Indeed, as shown in the illustrated embodiment, an optical rib waveguide is formed in the coupling region with insulating layer 409 separating first and second optical waveguides 405 and 407.

In one embodiment, insulating layer 409 is made of silicon oxide and is approximately 200 angstroms thick. It is appreciated of course that other suitable materials and that other suitable thicknesses and geometries may be utilized in accordance with the teachings of the present invention. Indeed, it is appreciated that device dimensions may be reduced considerably in accordance with the teachings of the present invention with improved lithographic and processing conditions and technologies. When an electric field is applied across insulating layer 409, with for example signal $V_{SIGNAL}$ 113 of FIG. 1, the two layers of modulated charge layers 427 form on each side of insulating layer 409. As a result, the effective index of refraction across insulating layer 409 is reduced, which effectively introduces a stronger isolation or reduces the coupling strength between first and second optical waveguides 405 and 407. This in turn alters the coupling length L to L' as illustrated for example in FIGS. 3A and 3B.

In one embodiment, the modulated electric field across the insulating layer 409 is approximately 10 MV/cm. In this case, modulated charge layers 427 drop the index of refraction by approximately 0.02.

Figure 5:
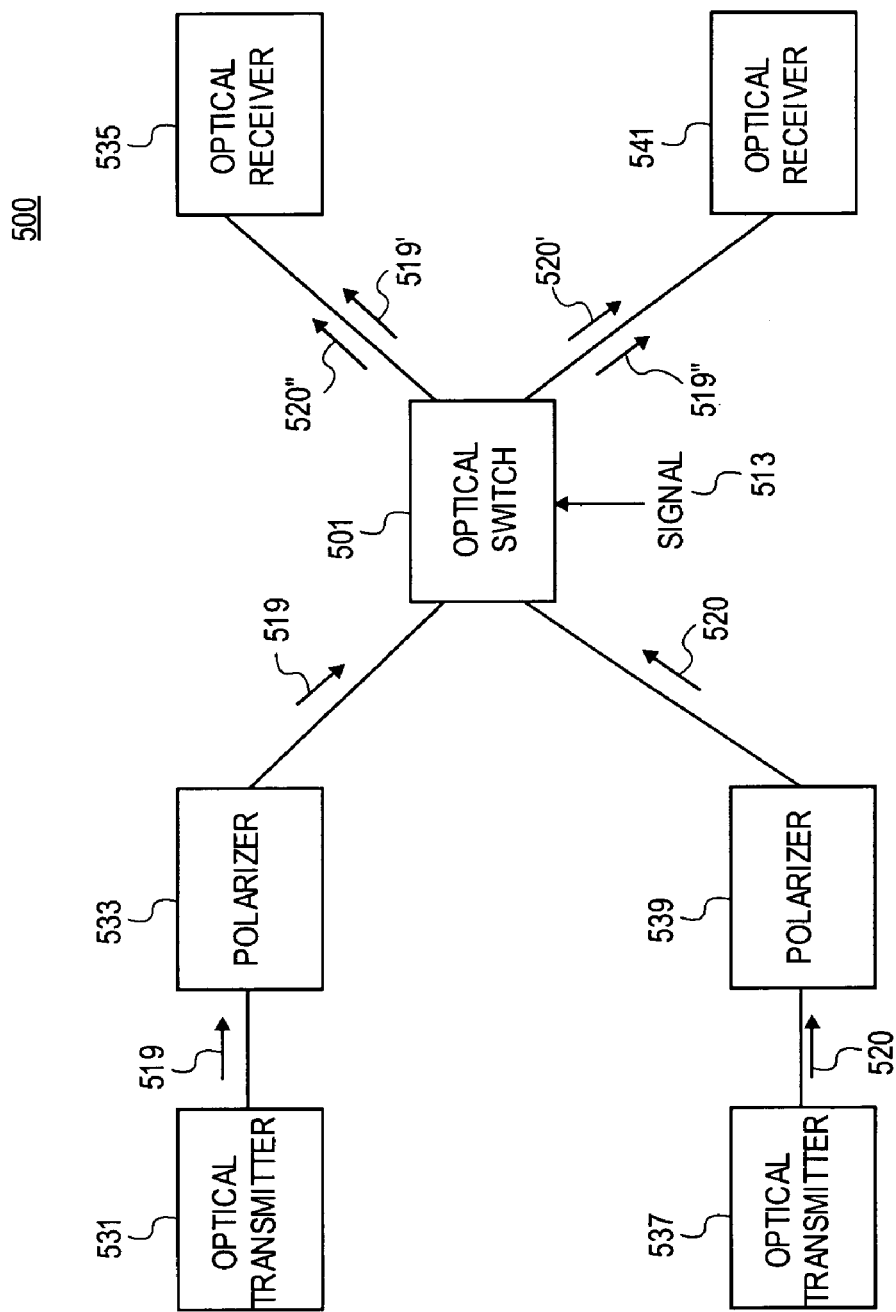
FIG. 5 is a block diagram illustration of a system including an optical device employed as an optical switch according to embodiments of the present invention.

FIG. 5 is a block diagram illustration of a system 500 including an optical switch 501 employed as a 2×2 optical switch according to embodiments of the present invention. It is appreciated that optical switch 501 may utilize any one of the optical devices 101, 201, 301 or 401 discussed above in accordance with the teachings of the present invention. In the depicted embodiment, system 500 includes an optical transmitter 531 and an optical transmitter 537. In one embodiment, a polarizer 533 is optically coupled to an output of optical transmitter 531 and a polarizer 539 is optically coupled to an output of optical transmitter 537. Optical transmitter 531 outputs an optical beam 519, which is polarized with polarizer 533 and optical transmitter 537 outputs an optical beam 520, which is polarized with polarizer 539. One input of optical switch 501 is optically coupled to receive optical beam 519 and another input of optical switch 501 is optically coupled to receive optical beam 520. As illustrated in the depicted embodiment, optical switch 501 includes two outputs. In operation, optical switch 501 is coupled to receive a signal 513, which is used to switch optical beam 519 and/or optical beam 520. In response to signal 513, optical beam 519 may be selectively switched to be optically received by optical receiver 535 as optical beam 519' or optically received by optical receiver 541 as optical beam 519". Similarly, optical beam 520 may be selectively switched to be optically received by optical receiver 535 as optical beam 520" or optically received by optical receiver 541 as optical beam 520'.

In one embodiment, optical switch 501 can be used in a number of architectures to build N×N optical switches. For instance, in the illustrated embodiment, optical switch 501 is a 2×2 optical switch, which can be combined with other 2×2 optical switches to build 4×4 optical switches, 8×8 optical switches, etc. Examples of known architectures that can be used to achieve this are: Benes (rearrangeably nonblocking switch architecture), Spanke-Benes (n-stage planar architecture), Spanke (strict sense non-blocking) or other suitable architectures that may employ 2×2 optical switches as components.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a first optical waveguide disposed in a semiconductor substrate layer, the first optical waveguide including a first charge layer;
   a second optical waveguide disposed in the semiconductor substrate layer, the second optical waveguide including a second charge layer;
   an electrically insulating layer disposed between the first and second waveguides in a coupling region in the semiconductor substrate layer to isolate the first optical waveguide from the second optical waveguide to separate the first charge layer from the second charge layer, the first and second charge layers formed proximate to the insulating region; and
   modulated charge layers including the first and second charge layers in the semiconductor substrate layer of the first and second optical waveguides, respectively, separated by and proximate to the electrically insulating layer between the first and second optical waveguides in the coupling region to control an optical coupling strength between the first and second optical waveguides.

2. The apparatus of claim 1 wherein an optical beam directed through the first optical waveguide is selectively directed to the first or second optical waveguide out from the coupling region in response to the modulated charge layers.

3. The apparatus of claim 1 wherein a capacitive structure is defined in the coupling region with the first and second charge layers in the first and second optical waveguides separated with the electrically insulating layer.

4. The apparatus of claim 1 wherein the optical coupling strength between the first and second optical waveguides comprises an evanescent coupling strength through the electrically insulating layer separating the first and second charge layers included in the first and second optical waveguides.

5. The apparatus of claim 1 wherein an amplitude of an optical beam directed through the first optical waveguide is selectively modulated in response to the modulated charge layers.

6. The apparatus of claim 1 wherein an optical beam directed through the first optical waveguide is variably optically attenuated in response to the modulated charge layers.

7. The apparatus of claim 1 wherein an electric field is to be modulated across the electrically insulating layer separating the first and second charge layers in response to a signal to control the optical coupling strength between the first and second optical waveguides.

8. The apparatus of claim 1 wherein an index of refraction across the electrically insulating layer separating the first and second charge layers in the coupling region is modulated in response to the modulated charge layers to control the optical coupling strength between the first and second optical waveguides.

9. The apparatus of claim 1 wherein a coupling length of the coupling region is modulated in response to the modulated charge layers.

10. The apparatus of claim 1 wherein the semiconductor substrate layer includes silicon.

11. The apparatus of claim 1 wherein the electrically insulating layer separating the and second charge layers includes an oxide.

12. The apparatus of claim 1 wherein the first and second optical waveguides comprise single mode optical waveguides.

13. The apparatus of claim 1 wherein the optical beam comprises light polarized parallel to the electrically insulating layer separating the first and second charge layers.

14. The apparatus of claim 1 wherein the coupling region comprises two single mode asymmetric waveguides separated by the electrically insulating layer separating the first and second charge layers, the two single mode asymmetric waveguides including the first and second optical waveguides.

15. A method, comprising:
   directing an optical beam into a first optical waveguide disposed in a semiconductor substrate layer; and
   modulating an electric field across an electrically insulating layer disposed between the first optical waveguide and a second optical waveguide with modulated charge layers in the semiconductor substrate layer, the modulated charge layers including a first charge layer in the first optical waveguide and a second charge layer in the second optical waveguide, the first and second charge layers separated by and proximate to the electrically insulating layer between the firs and second optical waveguides, wherein the second optical waveguide is disposed in the semiconductor substrate layer and wherein the electrically insulating layer separating the first and second charge layers isolates the first optical waveguide from the second optical waveguide such that an optical coupling strength between the first and second optical waveguides across the electrically insulating layer separating the first and second charge layers in a coupling region in the semiconductor substrate layer is modulated in response to the modulated electric field.

16. The method of claim 15 wherein modulating the electric field comprises adjusting an evanescent optical coupling between the first and second optical waveguides in response to the modulated electric field.

17. The method of claim 15 further comprising selectively directing the optical beam to the first or second optical waveguide out from the coupling region in response to modulating the electric field across the electrically insulating layer separating the first and second charge layers.

18. The method of claim 15 further comprising modulating an index of refraction across the electrically insulating layer separating the first and second charge layers in response to modulating the electric field across the electrically insulating layer separating the first and second charge layers.

19. The method of claim 15 further comprising modulating a charge concentration in the first and second charge layers of the modulated charge layers proximate to the electrically insulating layer separating the first and second charge layers in response to modulating the electric field across the electrically insulating layer separating the first and second charge layers.

20. The method of claim 15 further comprising selectively modulating an amplitude of the optical beam directed through the first optical waveguide out from the coupling region in response to modulating the electric field across the electrically insulating layer separating the first and second charge layers.

21. The method of claim 15 further comprising variably optically attenuating the optical beam directed through the first optical waveguide out from the coupling region in response to modulating the electric field across the electrically insulating layer separating the first and second charge layers.

22. A system, comprising:
an optical transmitter to transmit an optical beam;
an optical switch including
a first optical waveguide disposed in a semiconductor substrate layer, the first optical waveguide including a first charge layer, the first optical wave guide optically coupled to the optical transmitter receive the optical beam;
a second optical waveguide disposed in the semiconductor substrate layer, the second optical waveguide including a second charge layer;
an electrically insulating layer disposed between the first and second waveguides in a coupling region in the semiconductor substrate layer to isolate the first optical waveguide from the second optical waveguide to separate the first charge layer from the second charge layer, the first and second charge layers formed proximate to the insulating region; and
modulated charge layers including the first and second charge layers in the semiconductor substrate layer of the first and second optical waveguides, respectively, separated by and proximate to the electrically insulating layer between the first and second optical waveguides in the coupling region to control an optical coupling strength between the first and second optical waveguides, the optical beam selectively directed to the first or second optical waveguide out from the coupling region in response to the modulated charge layers;
a first optical receiver optically coupled to the first optical waveguide; and
a second optical receiver optically coupled to the second optical waveguide.

23. The system of claim 22 wherein an amplitude of the optical beam directed through the first optical waveguide is selectively modulated in response to the modulated charge layers.

24. The system of claim 22 wherein the optical beam directed through the first optical waveguide is variably optically attenuated in response to the modulated charge layers.

25. The system of claim 22 wherein an electric field is to be modulated across the electrically insulating layer separating the first and second charge layers to modulate a charge concentration in the modulated charge layers.

26. The system of claim 22 wherein an index of refraction across the electrically insulating layer separating the first and second charge layers is modulated in response to the modulated charge layers.

27. The system of claim 22 wherein a coupling length of the coupling region is modulated in response to the modulated charge layers.

28. The system of claim 22 further comprising:
a first polarizer optically coupled to the first optical waveguide, the first polarizer to polarize the optical beam parallel to the electrically insulating layer separating the first and second charge layers; and
a second polarizer optically coupled to the second optical waveguide, the second polarizer to polarize a second optical beam directed through the second optical waveguide parallel to the electrically insulating layer separating the first and second charge layers.

* * * * *

UNITED STATES PATENT AND TRADEMARK OFFICE
CERTIFICATE OF CORRECTION

PATENT NO. : 7,013,070 B2
APPLICATION NO. : 10/162826
DATED : March 14, 2006
INVENTOR(S) : Nicolaescu Page 1 of 1

It is certified that error appears in the above-identified patent and that said Letters Patent is hereby corrected as shown below:

In column 8, at line 26, after "the" insert --first--.

Signed and Sealed this

Fifteenth Day of April, 2008

JON W. DUDAS
*Director of the United States Patent and Trademark Office*